Patented Sept. 7, 1943

2,329,014

UNITED STATES PATENT OFFICE 2,329,014

JOINT-MAKING MATERIAL FOR PIPES OR THE LIKE

Charles Harold Taylor, New Barnet, England

No Drawing. Application October 14, 1940, Serial No. 361,189. In Great Britain October 13, 1939

3 Claims. (Cl. 106—99)

(Granted under the provisions of sec. 14, act of March 2, 1927; 357 O. G. 5)

This invention relates to joint-making materials for pipes or the like and is concerned particularly with the making of watertight joints of the spigot-and-socket type.

It has been proposed heretofore (see prior Letters Patent Nos. 164,850, 927,312, 1,463,123 and 1,610,203) to make compositions comprising a filler, cement, lime and an alkali silicate or carbonate but such compositions have been intended for the manufacture of artificial stone, building materials or cold moulded articles and the proportions of the ingredients have been determined as best would suit these purposes. Such compositions are not suitable for making joints of pipes or the like since in some cases they do not comprise a fibrous filler and therefore are not resilient and in other cases, while containing a fibrous filler such as asbestos, they necessitate a special treatment after moulding to shape, such as heating or saturating with a solution containing the alkali silicate, which could not conveniently be applied to pipe joints.

The main object of the present invention is the provision of a dry composition which, when moistened with water, shall be eminently suitable for making pipe joints by a caulking operation and shall have the proportions of the ingredients of the composition so determined that the requisite resilience is provided and no subsequent treatment of the joint is required.

In carrying out the invention a mixture is prepared comprising asbestos fibre, cement, hydrated lime and an alkali carbonate or silicate. The mixture is prepared and packed for sale in the dry state and is moistened with a small amount of water prior to use whereupon it may be rolled or shaped to an elongated pliable rod which is wrapped around the spigot end of a pipe adjacent to the free end of the pipe socket into which it has been inserted. The pliable or plastic mass is then rammed into the annular space between the spigot and the socket by the aid of a caulking tool. The pressure to which the mass is subjected expresses most of the moisture therefrom and this collects in the annular space above or beyond the compressed mass. A further quantity of the dry mixture may then be inserted into the space and rammed home as before, the excess moisture being absorbed by the dry mixture. A test can be taken immediately the joint is made and, after the material has set, there is sufficient resilience in the jointing material to accommodate the expansions and contractions consequent upon very considerable changes in temperature. The material is comparatively light in weight and is very easily manipulated and applied.

A very suitable mixture comprises long fibre asbestos (say from ½" to 1½" long)—10% by weight, white Portland cement—70% by weight, finely powdered sodium carbonate—10% by weight, and powdered hydrated lime—10% by weight. Powdered iron oxide may be added in a sufficient amount to darken the mixture to a colour approximating to that of the pipes in connection with which it is to be employed and other insoluble pigments may be employed in its stead, if desired. Although sodium carbonate is preferred as the substance for accelerating the hardening of the mixture other alkali carbonates or alkali silicates may be employed for this purpose. The proportion by weight of the accelerator may vary between 8 and 12 per cent. The hydrated lime, which has a water-proofing or pore-closing action may similarly be varied in amount from 8 to 12 per cent. of the mixture.

What I claim is:

1. A dry material for use in making joints of pipes or the like, comprising substantially 10% by weight of asbestos fibre, 70% by weight of powdered cement, between 8% and 12% by weight of a powdered alkali carbonate and between 8% and 12% by weight of powdered hydrated lime.

2. A dry material for use in making joints of pipes or the like, comprising substantially 10% by weight of asbestos fibre, 70% by weight of powdered cement, between 8% and 12% by weight of a powdered alkali silicate and between 8% and 12% by weight of powdered hydrated lime.

3. A dry material for use in making joints of pipes or the like, comprising 10% by weight of asbestos fibre, 70% by weight of Portland cement, 10% by weight of powdered sodium carbonate and 10% by weight of powdered hydrated lime.

CHARLES HAROLD TAYLOR.